United States Patent Office 2,807,631
Patented Sept. 24, 1957

2,807,631
ADDITION COMPOUNDS OF SELENIC ACID DERIVATIVES

Walter Jenny, Reinach, Switzerland, assignor to Ciba Limited, Basel, Switzerland, a Swiss firm No Drawing. Application June 28, 1954, Serial No. 439,902

Claims priority, application Switzerland July 1, 1953

6 Claims. (Cl. 260—369)

According to this invention valuable new addition compounds are made by reacting a compound which yields the radical of the formula:

(1)  A—Se— in which A represents an aromatic radical, with an unsaturated organic compound.

As starting materials which yield the radical of the Formula 1, there come into consideration more especially acyl compounds, for example acetyl compounds of the constitution:

(2)  A—Se—O—acyl

The radical A may be any aromatic radical but preferably a vattable radical. Of especial interest are those starting materials in which the radical A is an anthraquinone radical, preferably attached in α-position to the selenium atom and which, if desired, may contain further substituents, for example alkoxy groups such as the methoxy group. The compounds of the Formula 2 can as a rule be easily prepared by reacting a compound of the formula:

A—Se—O—alkyl with the acid from which the acyl radical to be introduced is derived or by reacting a compound of the formula:

A—Se—halogen with a salt of an acid which contains the desired acyl radical.

The unsaturated compounds, with which the vattable starting material defined above is additively combined, advantageously contain as the unsaturated group of a >C=< grouping, as is present, for example, in ethylene, vinyl acetate, allyl bromide, isobutylene, butadiene, styrenes such as styrene itself or 1-methyl-2-phenylethylene or 1-methyl-1-phenyl-ethylene, cyclohexene or dihydropyrane.

The reaction is advantageously carried out in an organic solvent such, for example, as glacial acetic acid, at a raised temperature. The use of this solvent has also the advantage that without intermediate separation it allows of the preparation of the starting materials of the Formula 2 from the compounds of the constitution:

A—Se—O—alkyl or A—Se—halogen and the attachment of the unsaturated compounds to the resulting compounds of the Formula 2 existing in solution.

According to the present process these are obtained addition products of the constitution (3)  A—Se—R in which A represents an aromatic radical and R represents an organic radical of which a carbon atom is bound directly to the selenium atom, the latter carbon atom being bound directly to a further carbon atom of radical R.

Of special interest are the addition products obtainable from a compound of the Formula 2 and a compound containing a >C=C< group and having the formula:

(4) 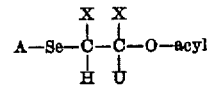

in which A has the above significance, both X's represent hydrogen atoms or together with the —C—C-group represent a ring, for example a carbocyclic ring, or in which one X represents a hydrogen and the other X represents an organic radical, for example an aromatic radical or an —O—acyl group and in which U represents a hydrogen atom or an alkyl group.

Depending on the nature of the substituents X and U, the reaction may proceed further with the splitting off of carboxylic acid whereby compounds of the constitution:

(5) 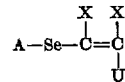

are formed, in which A, X and U have the above significance. Such a reaction takes place, for example, in the reaction of anthraquinone-1-selenyl acetate with 1-methyl-1-phenylethylene or dihydropyrane.

Further reactions can be carried out with the new compounds of the Formulae 3 and 4. Thus, for example, the —O—acyl groups of compounds of the Formula 4 can be hydrolyzed to hydroxyl groups, and in this manner hydroxyl compounds are obtained of the constitution:

(6) 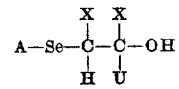

in which A, the two X's and U have the above significance.

The compounds of the Formulae 3, 4, 5 and 6 are valuable intermediate products, for example, for the manufacture of dyestuffs. In so far as they contain anthraquinone radicals, they can, as a rule, be also used directly as dyestuffs, for example as pigments and especially as dispersion dyestuffs for dyeing or printing cellulose acetate artificial silk or polyamide fibers.

Particularly valuable are the compounds of the formula

A—Se—R in which A represents an aromatic radical, such as for example an anthraquinone radical or a benzene radical and R represents one of the following radicals:

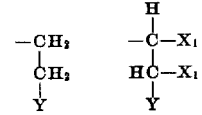

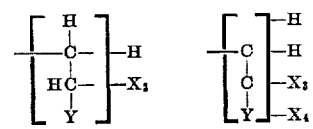

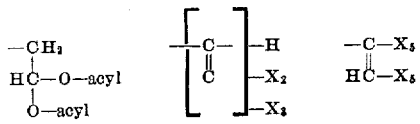

In the above formulae both $X_1$'s, together with the —C—C-group, represents a cycloalkyl, for instance a cyclo-hexyl radical, $X_2$ represents a benzene radical, $X_3$ and $X_4$ each represent an alkyl radical, preferably one of low molecular weight such as a methyl group, both $X_5$'s, together with the —C=C-group, represent a pyrane radical and Y represents a hydroxyl group, or an —O-acyl group, for example an —O-acetyl group.

The following examples illustrate the invention; the parts and percentages being by weight unless otherwise stated and the relation between part by weight and part by volume being the same as that between the kilogram and the liter.

*Example 1*

34.5 parts of anthraquinone-1-selenic acid methyl ester (prepared according to Helv. Chim. Acta, vol. 35, page 849 (1952)) are boiled for a short time in 1000 parts by volume of glacial acetic acid and in this manner converted into anthraquinone-1-selenyl acetate of the formula:

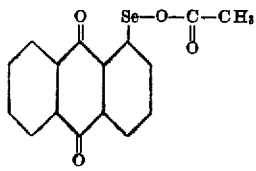

After the addition of 10 parts of cyclohexene, the whole is maintained for 1 hour at boiling temperature, then allowed to cool, filtered and the filtrate treated with a large quantity of water. The precipitate is filtered with suction and well washed with water and dried under vacuum at 80° C. The resulting 1-(2'-acetoxy-cyclohexyl-selenyl)-anthraquinone of the formula:

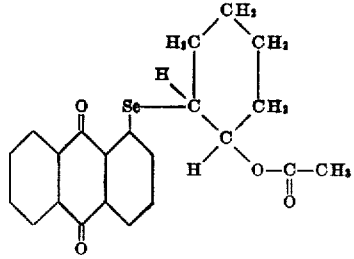

(about 37 parts) crystallizes from 2000 parts by volume of 96% ethanol in beautiful, narrow, yellow-orange leaflets of melting point 169° C. A product repeatedly recrystallized from ethanol gave the following analytical values:

$C_{22}H_{20}O_4Se$ (427.3)—Calculated: C, 61.83; H, 4.72; Se, 18.48%. Found: C, 62.07; H, 4.94; Se, 18.60%.

*Example 2*

1.6 parts of anthraquinone-1-selenic acid methyl ester are dissolved in 100 parts by volume of hot glacial acetic acid (see Example 1). After the addition of 3 parts of styrene the whole is boiled for 5 minutes, allowed to cool, treated with water, well stirred and filtered with suction. After washing with water, the yellow compound of the formula:

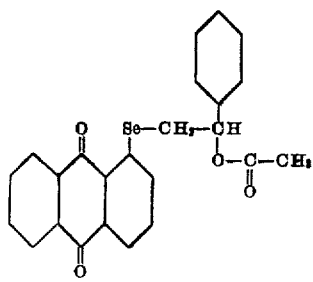

crystallizes from 96% ethanol in golden-yellow small needles which melt at 139–140° C. The product has the following analysis:

$C_{24}H_{18}O_4Se$ (449.3)—Calculated: C, 64.15; H, 4.04; Se, 17.57%. Found: C, 64.06; H, 4.08; Se, 17.37%.

*Example 3*

1 part of 1-(2'-acetoxy-cyclohexylselenyl)-anthraquinone (see Example 1) is dissolved in 160 parts by volume of hot 96% ethanol and the whole treated with a solution of 1 part of potassium hydroxide in 10 parts of water and 90 parts of ethanol and boiled for 1 hour in a steambath. After cooling, dilution with a large quantity of water is effected and the product allowed to stand for several hours, after which the golden-yellow precipitate is filtered off. The compound, which after drying has become orange colored, is recrystallized from 96% ethanol. There is thus obtained the 1-(2'-hydroxy-cyclohexylselenyl)-anthraquinone of the formula:

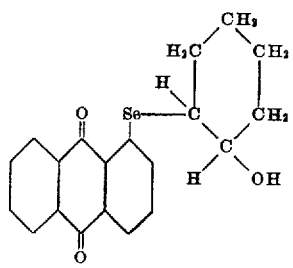

in small, compact, brown-red needles which melt at 171° C. The product gives the following analysis.

$C_{20}H_{18}O_3Se$ (385.3): Calculated: C, 62.34; H, 4.71; Se, 20.49%. Found: C, 62.61; H, 4.91; Se, 20.4%.

By acetylation by means of acetyl chloride in benzene and in the presence of pyridine, the resulting hydroxyl compound can be reconverted into the 1-(2'-acetoxy-cyclohexyl-selenyl)-anthraquinone.

*Example 4*

2.6 parts of 1-methoxyanthraquinone-4-selenyl bromide (for the preparation of which see Helv. Chim. Acta., vol. 35, page 1432 (1952)) in 150 parts of glacial acetic acid with the addition of 1.4 parts of silver acetate, are converted by boiling for ½ hour into the 1-methoxy-anthraquinone-4-selenyl acetate. The hot filtered solution is treated with 1 part of cyclohexene and boiled for a further 3 minutes under reflux. The liquid is again filtered hot and the cooled filtrate treated with a large quantity of water. The fine suspension is well shaken with petroleum ether and allowed to stand for 2 days. The precipitated red powder is now filtered with suction, washed with water and dried under vacuum at 90° C. By crystallization from very little 96% ethanol, 1-methoxy-4-(2'-acetoxy-cyclohexylselenyl)-anthraquinone of the formula

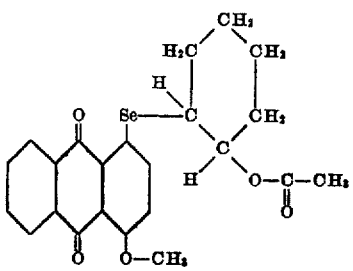

is obtained in small red needles which melt at 142–143° C. The resulting product had the following analysis:

$C_{23}H_{22}O_5Se$ (457.4)—Calculated: C, 60.40; H, 4.85%. Found: C, 60.67; H, 5.06%.

*Example 5*

5 parts of anthraquinone-1-selenic acid methyl ester are dissolved in 300 parts of hot glacial acetic acid, treated with 12 parts of vinyl acetate and the whole boiled for 10 minutes. It is then allowed to cool, filtered with suction, washed with water, alcohol and petroleum ether and dried. Small yellow crystals are obtained which melt at 198° C. and crystallize from a large quantity of alcohol in small yellow needles of melting point 200° C. As shown by analysis, an ethylidene diacetate is formed of the empirical formula $C_{20}H_{16}O_6Se$ Analysis:

|  | C | H |
|---|---|---|
| Calculated | Percent 55.69 | Percent 3.74 |
| Found | 55.86 | 3.81 |

Example 6

5 parts of anthraquinone-1-selenic acid methyl ester are dissolved in 300 parts of hot glacial acetic acid, treated with 15 parts of 1-methyl-1-phenylethylene and the whole boiled for 20 minutes under reflux. After filtration in the hot, the filtrate is allowed to cool, filtered with suction and the precipitate washed with water, alcohol and petroleum ether and dried. The reaction product can be recrystallized from a large quantity of alcohol. It crystallizes in a yellow (labile) and a red (stable) form. The red crystals melt at 168° C. Analysis indicates the formation of an ethylene compound of the constitution:

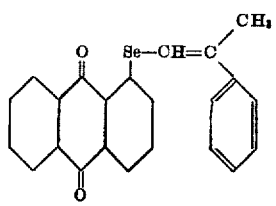

Analysis:

|  | C | H |
|---|---|---|
| Calculated for $C_{22}H_{20}O_4Se$ | Percent 64.80 | Percent 4.35 |
| Calculated for $C_{23}H_{18}O_2Se$ | 68.49 | 4.00 |
| Found | 68.46 | 4.09 |

Example 7

5 parts of anthraquinone-selenic acid methyl ester are dissolved in 400 parts of hot glacial acetic acid. Isobutylene is conducted into this solution in a brisk stream for 2 hours. Thereupon the whole is filtered hot and the cooled filtrate treated slowly with water. The reaction product thereby crystallizes out in yellow needles. It crystallizes from a little alcohol in golden-yellow needles which melt at 144° C. The addition product has probably the constitution:

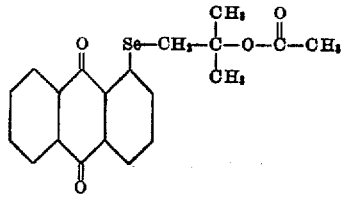

Analysis:

|  | C | H |
|---|---|---|
| Calculated for $C_{20}H_{18}O_4Se$ | Percent 59.85 | Percent 4.52 |
| Found | 59.96 | 4.52 |

Example 8

5.1 parts of 1-hydroxy-anthraquinone-4-selenyl acetate and 12 parts of vinyl acetate in 300 parts of glacial acetic acid are boiled for 2 hours under reflux. The liquid is then filtered hot. From the cooled filtrate, the addition product crystallizes in small red needles. It can be recrystallized from a large quantity of alcohol. Melting point 204° C. The reaction product has probably the constitution:

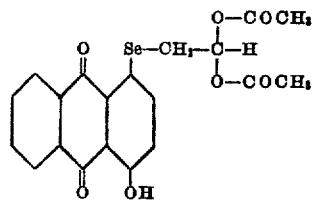

Analysis:

|  | C | H |
|---|---|---|
| Calculated for $C_{20}H_{16}O_7Se$ | Percent 53.69 | Percent 3.57 |
| Found | 53.68 | 3.64 |

Example 9

5 parts of anthraquinone-selenyl acetate are dissolved in 35 parts of hot glacial acetic acid. Ethylene is passed into this solution at 70–80° C. for 2 hours in a brisk stream. The liquid is then filtered hot and the filtrate allowed to cool. The addition product produced in orange colored needles can be recrystallized from a large quantity of ethanol. Melting point 153–155° C.

Analysis:

|  | C | H |
|---|---|---|
| Calculated for $C_{18}H_{14}O_4Se$ | Percent 57.92 | Percent 3.78 |
| Found | 57.63 | 3.62 |

Example 10

5 parts of anthraquinone-1-selenic acid methyl ester are dissolved in 300 parts of hot glacial acetic acid, treated with 5 parts of dihydropyrane and the whole boiled for 1 hour under reflux. The liquid is then filtered hot. The reaction product is deposited on cooling of the filtrate in orange colored needles. It can be recrystallized from alcohol. Melting point 173° C. The reaction product has probably the constitution:

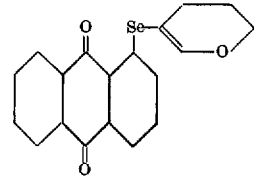

Analysis:

|  | C | H |
|---|---|---|
| Calculated for $C_{21}H_{18}O_4Se$ | Percent 58.75 | Percent 4.23 |
| Calculated for $C_{19}H_{14}O_4Se$ | 61.78 | 3.78 |
| Found | 61.81 | 3.88 |

Example 11

5.2 parts of 1-nitrobenzene-2-selenyl acetate and 2.6 parts of vinyl acetate are boiled under reflux for ½ hour in 100 parts of glacial acetic acid. The glacial acetic acid is then distilled off under vacuum. The residue solidifies to a crystalline yellow mass. It crystallizes from alcohol in small yellow needles which melt at 94° C. The addition product has probably the constitution:

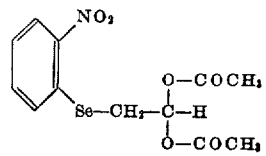

(N (calculated): 4.05%, N (found): 4.17%.)

Example 12

5 parts of anthraquinone-selenic acid methyl ester are dissolved in 300 parts of hot glacial acetic acid. Butadiene-(1:3) is introduced into the hot solution for 2 hours in a brisk stream. The addition product is isolated by dilution with water. It crystallizes from alcohol in small, orange colored crystals, which melt at 106° C.

Analysis: N (calculated for $C_{12}H_{13}O_6NSe$) 4.05%; N (found): 4.17%.

Example 13

0.5 part of the 1-(2'-hydroxy-cyclohexylselenyl)-anthraquinone obtained according to Example 3 is dissolved in 10 parts of 90% sulfuric acid at 0° C., poured onto a mixture of ice and water and filtered. The resulting filter cake is ground in a roller mill with 1 part of dried sulfite waste liquor. The suspension obtained is introduced into a dye-bath containing 9 parts of soap in 3000 parts of water, 100 parts of well wetted cellulose acetate artificial silk are entered at 40° C., the temperature is raised to 80° C., and dyeing is carried out for 1 hour at 80–85° C. The acetate silk is dyed yellow.

Instead of acetate silk, nylon can also be dyed according to the directions given above. The products obtained according to the other examples can also be used in this manner for the dyeing of acetate silk or nylon.

What is claimed is:

1. A compound of the formula A—Se—R in which A represents an aromatic radical selected from the group consisting of the radicals of the formulae

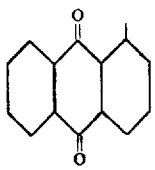

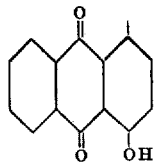

and

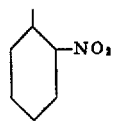

and R stands for a member selected from the group consisting of the radicals of the formulae

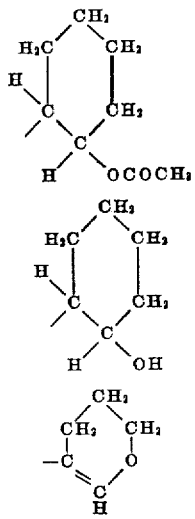

and

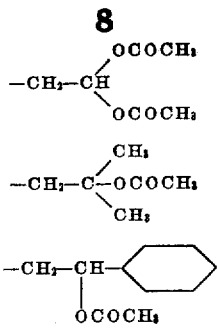

2. The compound of the formula

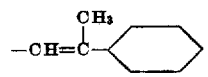

3. The compound of the formula

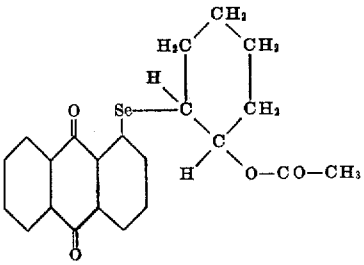

4. The compound of the formula

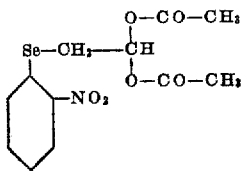

5. The compound of the formula

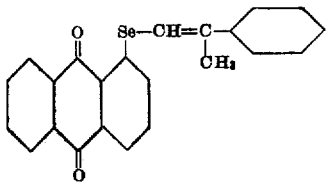

6. The compound of the formula

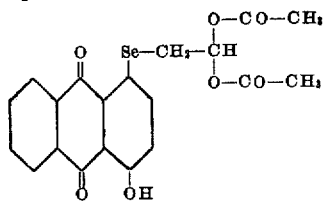

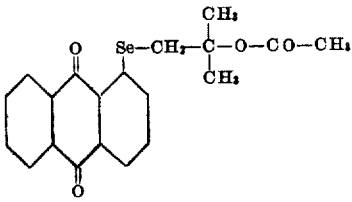

References Cited in the file of this patent

UNITED STATES PATENTS 2,187,819    Koeberle et al. _____ Jan. 23, 1940

OTHER REFERENCES

Jenny: Helv. Chim. Acta., vol 35, page 849 (1952).

UNITED STATES PATENT OFFICE
CERTIFICATE OF CORRECTION

Patent No. 2,807,631 September 24, 1957

Walter Jenny

It is hereby certified that error appears in the printed specification of the above numbered patent requiring correction and that the said Letters Patent should read as corrected below.

Column 1, line 46, for "$>$C$=$$<$" read -- $>$C$=$C$<$ --.

Signed and sealed this 26th day of November 1957.

(SEAL)
Attest:

KARL H. AXLINE
Attesting Officer

ROBERT C. WATSON
Commissioner of Patents